(12) United States Patent
Chang et al.

(10) Patent No.: US 12,723,989 B2
(45) Date of Patent: Sep. 1, 2026

(54) OPTICAL SCANNING SYSTEM FOR NON-DESTRUCTIVELY ACQUIRING THREE-DIMENSIONAL STRUCTURE OF OBJECT

(71) Applicant: OPXION TECHNOLOGY INC., New Taipei City (TW)

(72) Inventors: Feng-Yu Chang, New Taipei City (TW); Wen-Ju Chen, New Taipei City (TW); Ming-Feng Wu, New Taipei City (TW); Po-Hsu Su, New Taipei City (TW); Cheng-Yu Lu, New Taipei City (TW); Meng-Tsan Tsai, New Taipei City (TW)

(73) Assignee: OPXION TECHNOLOGY INC., New Taipei City (TW)

( * ) Notice: Subject to any disclaimer, the term of this patent is extended or adjusted under 35 U.S.C. 154(b) by 129 days.

(21) Appl. No.: 18/764,388

(22) Filed: Jul. 5, 2024

(65) Prior Publication Data

US 2025/0362239 A1 Nov. 27, 2025

(30) Foreign Application Priority Data

May 27, 2024 (TW) ................................ 113119516

(51) Int. Cl.
*G01N 21/88* (2006.01)
*G01B 9/02091* (2022.01)
*G01N 21/958* (2006.01)

(52) U.S. Cl.
CPC ..... *G01N 21/8851* (2013.01); *G01B 9/02091* (2013.01); *G01N 21/8806* (2013.01);
(Continued)

(58) Field of Classification Search
CPC ........... G01N 21/8851; G01N 21/8806; G01N 21/958; G01N 2201/1042;
(Continued)

(56) References Cited

U.S. PATENT DOCUMENTS

2017/0105618 A1* 4/2017 Schmoll ............. G01B 9/02044
2020/0146545 A1* 5/2020 Kumar .................. G06T 11/008
(Continued)

OTHER PUBLICATIONS

Aissa Manallah, Mohamed Bouafia, Said Meguellati, "Optical coherence tomography as film thickness measurement technique," Proc. SPIE 9450, Photonics, Devices, and Systems VI, 945006 (Jan. 6, 2015); https://doi.org/10.1117/12.2061387 (Year: 2015).*

*Primary Examiner* — Kara E. Geisel
*Assistant Examiner* — Jonathon Cook

(57) ABSTRACT

An optical scanning system for non-destructively acquiring a three-dimensional structure of an object includes an optical image processing device and an optical scanning device. The optical image processing device is configured to generate an optical beam along a first optical axis direction. The optical scanning device is configured to convert the optical beam along the first optical axis direction into an optical beam along a second optical axis direction, and scan an object to be inspected by using the optical beam along the second optical axis direction. The optical image processing device scans the object to be inspected by the optical scanning device along X-axis and Y-axis directions to acquire YZ and XZ cross section structural images at different consecutive positions, so as to reconstruct a three-dimensional structural image.

8 Claims, 11 Drawing Sheets

(52) U.S. Cl.
CPC ... *G01N 21/958* (2013.01); *G01N 2201/1042* (2013.01); *G01N 2201/1087* (2013.01)

(58) Field of Classification Search
CPC ........ G01N 2201/1087; G01B 9/02029; G01B 9/0203; G01B 9/02087; G01B 9/02091; G01B 2290/65
See application file for complete search history.

(56) References Cited

U.S. PATENT DOCUMENTS

| | | | | |
|---|---|---|---|---|
| 2020/0166328 | A1* | 5/2020 | Zhou | A61B 5/0066 |
| 2022/0214156 | A1* | 7/2022 | Shibayama | A61B 3/10 |
| 2022/0228850 | A1* | 7/2022 | Momiyama | G01N 21/45 |
| 2022/0341724 | A1* | 10/2022 | Chen | G01N 21/4795 |
| 2024/0027331 | A1* | 1/2024 | Tsai | A61B 5/6887 |
| 2025/0251352 | A1* | 8/2025 | Cheng | G01N 21/9501 |

* cited by examiner

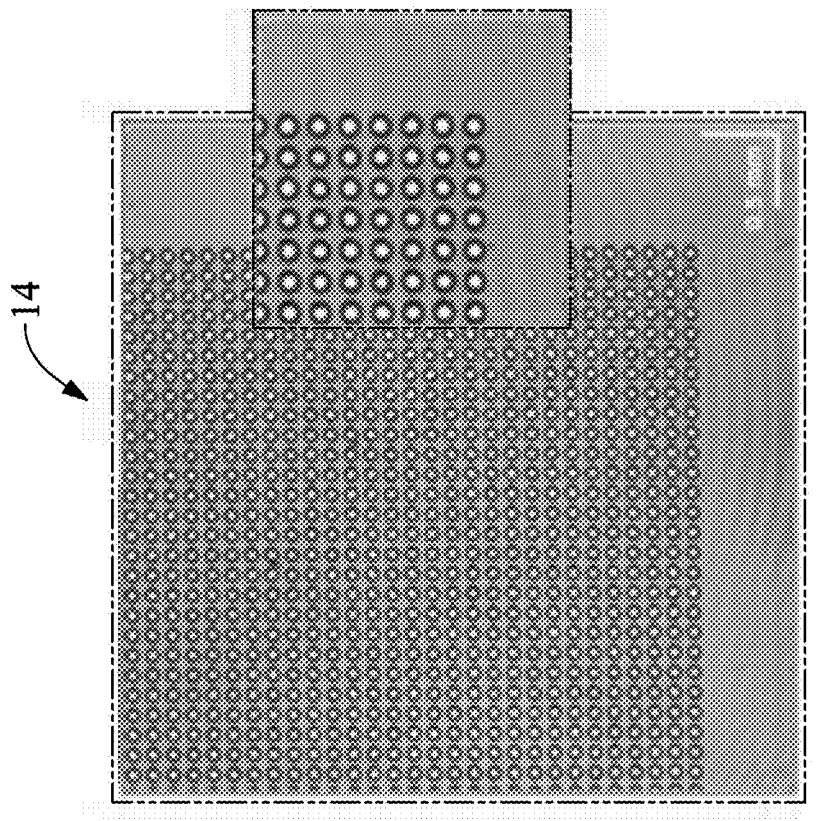
14
FIG. 6B
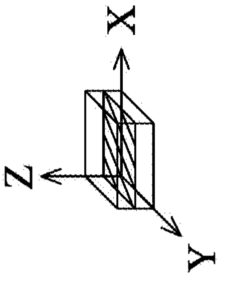
X
Z
Y

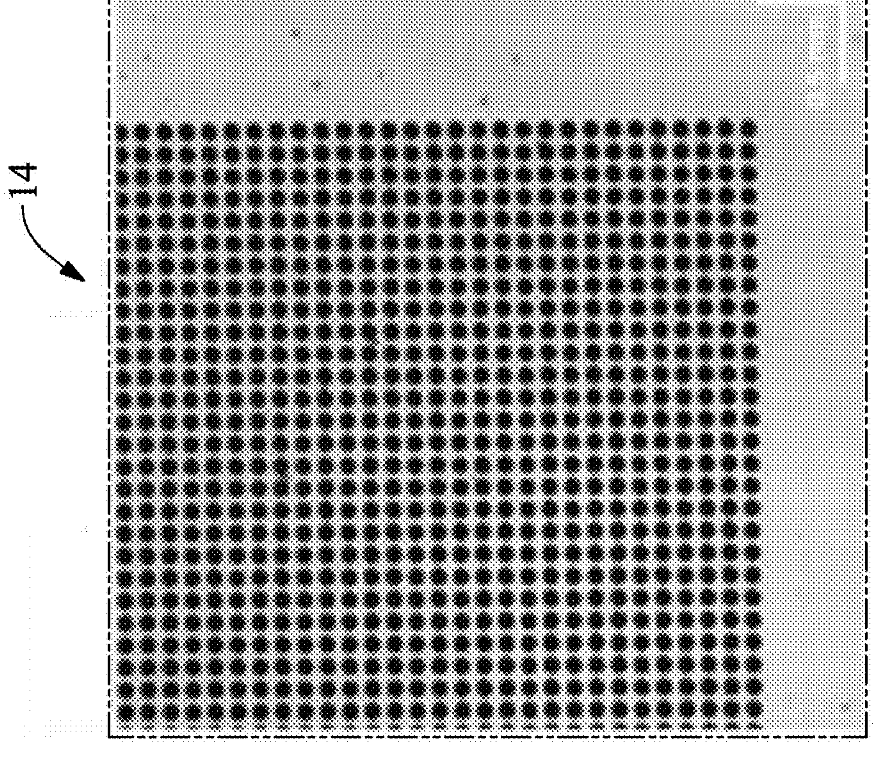
FIG. 6C
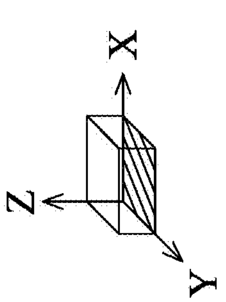

OPTICAL SCANNING SYSTEM FOR NON-DESTRUCTIVELY ACQUIRING THREE-DIMENSIONAL STRUCTURE OF OBJECT

CROSS-REFERENCE TO RELATED APPLICATION

This non-provisional application claims priority under 35 U.S.C. § 119(a) on Patent Application No(s). 113119516 filed in Taiwan, R.O.C. on May 27, 2024, the entire contents of which are hereby incorporated by reference.

BACKGROUND OF THE INVENTION

1. Field of the Invention

The present disclosure relates to an optical scanning system, and in particular to an optical scanning system for non-destructively acquiring a three-dimensional structure of an object.

2. Description of the Related Art

In the field of semiconductors, vertical electrical coupling between chips is implemented by the through glass via (TGV) technique of forming TGVs on a glass substrate and forming minute metal wires on the inside of and outside of the TGVs. As apertures of TGVs continue to decrease and depths continue to increase, the electrode density and the number of stacked layers in semiconductor devices can be increased, further promoting miniaturization of semiconductor devices.

However, defects frequently exist once TGVs are manufactured. Thus, the quality of TGVs needs to be inspected.

In one of current TGV inspection methods, a cross section is obtained by cutting a glass substrate and the quality of TGVs are inspected by a scanning electron microscope. However, the inspection method above is a destructive inspection method, and relatively increases manufacturing costs of TGVs.

In another method, a surface structure of a TGV is observed by using an optical microscope; however, an internal structure of the TGV cannot be observed and inspection in the Z-axis direction cannot be conducted. In yet another method, a glass substrate is first cut, and then an image of a TGV is formed by using a scanning electronic microscope. However, such scanning electronic microscope can be extremely expensive, and it is difficult for most TGV manufacturers to purchase such inspection apparatus.

BRIEF SUMMARY OF THE INVENTION

As described above, current TGV inspection methods face issues of increased TGV manufacturing costs, the inability of non-destructively observing an internal structure of a TGV and costly inspection apparatuses.

To overcome the issues above, it is an object of the present disclosure to provide an optical scanning system for non-destructively acquiring a three-dimensional structure of an object. The optical scanning system includes: an optical image processing device, configured to generate an optical beam along a first axis direction; and an optical scanning device, coupled to the optical image processing device, configured to convert the optical beam along the first optical axis direction into an optical beam along a second optical axis direction, and scan an object to be inspected by the optical beam along the second optical axis direction. The optical image processing device scans the object to be inspected along a Y-axis direction by the optical scanning device to acquire a YZ cross section structural image corresponding to the object to be inspected, and then scans along an X-axis direction to acquire sequential YZ cross section structural images corresponding to the object to be inspected at different consecutive positions. Alternatively, the optical image processing device further scans the object to be inspected along the X-axis direction by the optical scanning device to acquire an XZ cross section structural image corresponding to the object to be inspected at different consecutive positions, and then scans along the Y-axis direction to acquire sequential XZ cross section structural images corresponding to the object to be inspected at different consecutive positions. The optical image processing device further reconstructs a three-dimensional structural image of the object to be inspected according to the YZ cross section structural images corresponding to the object to be inspected at different consecutive positions along the X direction or the XZ cross section structural images corresponding to the object to be inspected at different consecutive positions along the Y direction.

In some embodiments, the optical scanning device further includes: an optical collimator, configured to convert the optical beam along the first optical axis direction into an optical beam parallel to the first optical axis direction; an optical beam scanner, disposed at an intersecting position of the first optical axis direction and the second optical axis direction, configured to convert the optical beam parallel to the first optical axis direction into an optical beam parallel to the second optical axis direction; a first lens group, disposed in the second optical axis direction, configured to expand or reduce the optical beam parallel to the second optical axis direction; a visible light camera module, disposed in the second optical axis direction, configured to capture a two-dimensional structural image corresponding to the object to be inspected; a second lens group, disposed in the second optical axis direction, configured to expand or reduce the optical beam parallel to the second optical axis direction; and an object lens module, disposed in the second optical axis direction and located on one side of the second lens group, configured to focus and project the optical beam parallel to the second optical axis direction onto the object to be inspected.

In some embodiments, the visible light camera module is composed of a camera, a visible light source and a beam splitter, wherein the beam splitter is disposed in the second optical axis direction.

In some embodiments, the camera and the visible light source are disposed on two opposite sides of the beam splitter, respectively.

In some embodiments, the visible light source is disposed closely next to the object lens module to illuminate the object to be inspected.

In some embodiments, the visible light source is disposed closely on a bottom surface of the object to be inspected to illuminate the object to be inspected.

In some embodiments, a focus magnification of the object lens module is adjustable/switchable.

In some embodiments, a steering device is further included. The steering device is coupled to the optical scanning device, and is operable to turn the optical scanning device and render the optical scanning device to deviate from the second optical axis direction by a predetermined angle.

In some embodiments, the optical image processing device further calculates a thickness value of the object to be inspected according to the YZ or XZ cross section structural images.

In some embodiments, when the object to be inspected is a glass substrate having multiple through glass vias (TGVs), the optical image processing device further identifies whether these TGVs are congested and/or defective according to the XY cross section structural images at the different consecutive positions in the Z-axis direction.

In conclusion, the optical scanning system for non-destructively acquiring a three-dimensional structure of an object uses, by the optical scanning device, optical beams to scan an object to be inspected so as to acquire optical signals, and then converts the optical signals by an optical image processing device to present a three-dimensional structural image corresponding to the object to be inspected, thereby readily simultaneously observing external and internal structures of the object to be inspected. Thus, the issue that a conventional optical microscope is unable to observe an internal structure of a sample, although capable of scaling up and imaging a surface of a sample and analyzing conditions of the surface of the sample via an obtained image of the surface, can be solved. Since the structure of the optical scanning device is far simpler and cheaper than a scanning electronic microscope, the issue of costly inspection apparatuses in the prior art can also be solved, and inspection costs of an object to be inspected can also be reduced. Moreover, the optical scanning device can further be deviated by a predetermined angle to inspect a structural image of the object to be inspected in a predetermined direction, hence enhancing measurement items of the optical scanning system.

BRIEF DESCRIPTION OF THE DRAWINGS

FIG. 6B is a diagram of an XY cross section structural image acquired at a waist in the Z-axis direction according to the first embodiment of the present disclosure.

FIG. 6C is a diagram of an XY cross section structural image acquired on a bottom surface in the Z-axis direction according to the first embodiment of the present disclosure.

DETAILED DESCRIPTION OF THE INVENTION

In the embodiments of the present disclosure, "an optical signal" can refer to an optical beam, a parallel optical beam or a focused optical beam. The optical beams above include visible light and invisible light (for example, near infrared light). The term "different consecutive positions" can refer to a target coordinate position and its neighboring coordinate positions in a same axis direction, for example, X1, X2, X3 . . . in the X axis, and so forth, Y1, Y2, Y3 . . . in the Y axis, and so forth, and Z1, Z2, Z3 . . . in the Z axis, and so forth.

Figure 1A:
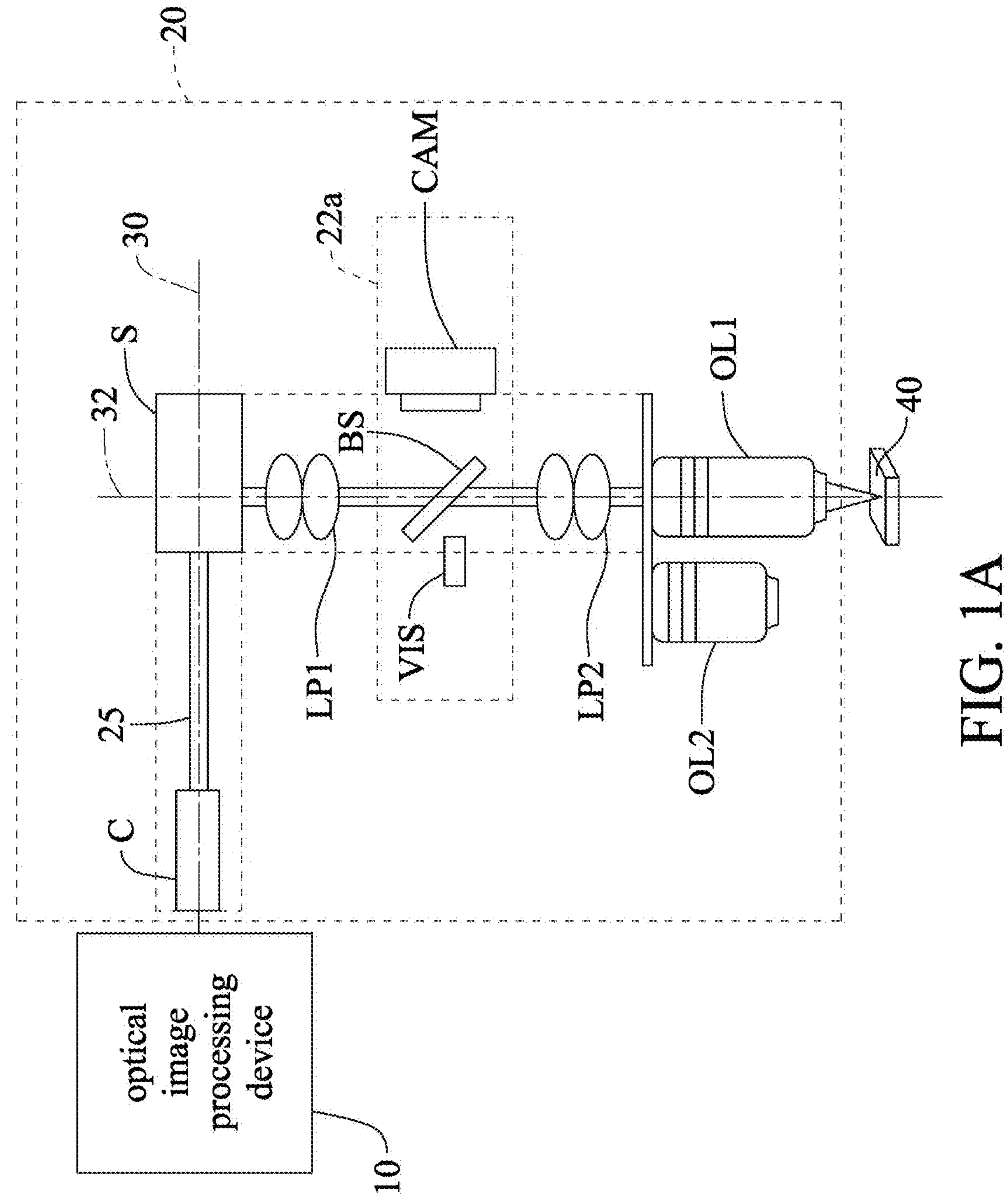
FIG. 1A is a schematic block diagram of an optical scanning system for non-destructively acquiring a three-dimensional structure of an object according to a first embodiment of the present disclosure.

Refer to FIG. 1A showing a schematic block diagram of an optical scanning system for non-destructively acquiring a three-dimensional structure of an object according to a first embodiment of the present disclosure. An optical scanning system 100 for non-destructively acquiring a three-dimensional structure of an object can include an optical image processing device 10 and an optical scanning device 20.

The optical image processing device 10 is configured to generate an optical beam 25 parallel to a first optical axis direction 30. The optical image processing device 10 can be composed of, for example but not limited to, a light source module, an interferometer, a spectrum analyzer, optical coherence tomography (OCT) instrument and a computer host. In the first embodiment of the present disclosure, the optical image processing device 10 and the optical scanning device 20 can be used to acquire a three-dimensional structural image corresponding to an object 40 to be inspected. Since the three-dimensional structural image above includes tomographic image data, the three-dimensional structural image can be used to inspect and determine whether an internal structure of a TGV is defective, hence solving the issue of the inability of inspecting an internal structure of a TGV in the prior art.

The optical scanning device 20 is coupled to the optical image processing device 10. The optical scanning device 20 is configured to convert the optical beam 25 along the first optical axis direction 30 into an optical beam 25 along a second optical axis direction 32, and scan the object 40 to be inspected by using the optical beam 25 along the second optical axis direction 32. The term "convert" refers to changing a traveling direction of the optical beam 25 from a first angle to a second angle; for example, the first angle is 0° while the second angle is 90°. In this embodiment, the first optical axis direction 30 is substantially perpendicular to the second optical axis direction 32.

An optical signal of the optical beam 25 reflected and/or scattered by a surface and an interior of the object 40 to be inspected is received by a first object lens OL1 and returns along an original path to the optical image processing device 10 for a process of signal-to-image conversion. The original path can be represented as follows: optical image processing device 10→optical collimator C→optical beam scanner S→first lens group LP1→beam splitter BS→second lens group LP2→first object lens OL1. The return path can be represented as follows: first object lens OL1→second lens group LP2→beam splitter BS→first lens group LP1→optical beam scanner S→optical collimator C→optical image processing device 10. In other embodiments, when the first object lens OL1 is switched to the second object lens OL2, the second object lens OL2 is used in substitution for the first object lens OL1 in the original path and the return path above.

The optical scanning device 20 can include the optical collimator C, the optical beam scanner S, the first lens group LP1, a visible light camera module 22*a*, the second lens group LP2, the first object lens OL1 and the second object lens OL2. In this embodiment, the first object lens OL1 and the second object lens OL2 can form an object lens module. A focus magnification of the object lens module is adjustable/switchable. For example, the focus magnification of the first object lens OL1 is different from the focus magnification of the second object lens OL2. The focus magnification of the first object lens OL1 can be greater than or less than the focus magnification of the second object lens OL2. In other embodiments, the number of object lenses in the object lens module be increased or decreased according to design requirements.

The optical collimator C is configured to receive the optical beam 25 along the first optical axis direction 30 generated by the optical image processing device 10, and convert the optical beam 25 along the first optical axis direction 30 into an optical beam 25 parallel to the first optical axis direction 30. The term "convert" above refers to gathering the optical beam 25 into the optical beam 25 parallel to the first optical axis direction 30.

The optical beam scanner S is disposed at an intersecting position of the first optical axis direction 30 and the second optical axis direction 32. The optical beam scanner S is configured to receive the optical beam 25 parallel to the first optical direction axis 30 passing through the optical collimator C, and convert the optical beam 25 parallel to the first optical axis direction 30 into a beam 25 parallel to the second optical axis direction 32.

The first lens group LP1 is disposed in the second optical axis direction 32. The first lens group LP1 is configured to expand or reduce the optical beam 25 parallel to the second optical axis direction 32. In this embodiment, the first lens group LP1 is configured to expand the optical beam 25 parallel to the second optical axis direction 32.

The visible light camera module 22*a* is disposed in the second optical axis direction 32. The visible light camera module 22*a* is configured to capture a two-dimensional (XY) image corresponding to the object 40 to be inspected.

The visible light camera module 22*a* can be composed of a camera CAM, a visible light source VIS and a beam splitter BS. The beam splitter BS can be disposed in the second optical axis direction 32, and the camera CAM and the visible light source VIS are disposed on two opposite sides of the beam splitter BS, respectively. More specifically, the camera CAM is disposed on the right of the second optical axis direction 32, the visible light source VIS is disposed on the left of the second optical axis direction 32, and a lens direction of the camera CAM in the visible light camera module 22*a* is substantially perpendicular to the second optical axis direction 32.

The operation details of the visible light camera module 22*a* are described below. Visible light generated by the visible light source VIS is turned by 90° by the beam splitter BS and is incident on the second lens group LP2, the visible light passing through the second lens group LP2 is then focused by the first object lens OL1 onto the object 40 to be inspected, and the visible light reflected by the object 40 to be inspected is turned by 90° by the beam splitter BS and enters the camera CAM for imaging, so as to capture the two-dimensional (XY) image corresponding to the object 40 to be inspected. Thus, the optical scanning device 20 can directly capture a two-dimensional (XY) image corresponding to the object 40 to be inspected by the visible light camera module 22*a*, and inspect the two-dimensional (XY) image, further improving ease of inspection for the object 40 to be inspected.

It should be noted that, because an optical microscope is capable of inspecting only a surface of a sample rather than an interior of a sample, and a scanning electronic microscope needs to first destroy a sample for pre-processing and post-imaging, non-destructive full inspection cannot be performed for a sample. The structure of the optical scanning device 20 is much simpler and cheaper compared with a current scanning electronic microscope. Thus, the issue of costly inspection apparatuses in the prior art can also be solved, and inspection costs of an object 40 to be inspected can also be reduced.

Figure 1B:
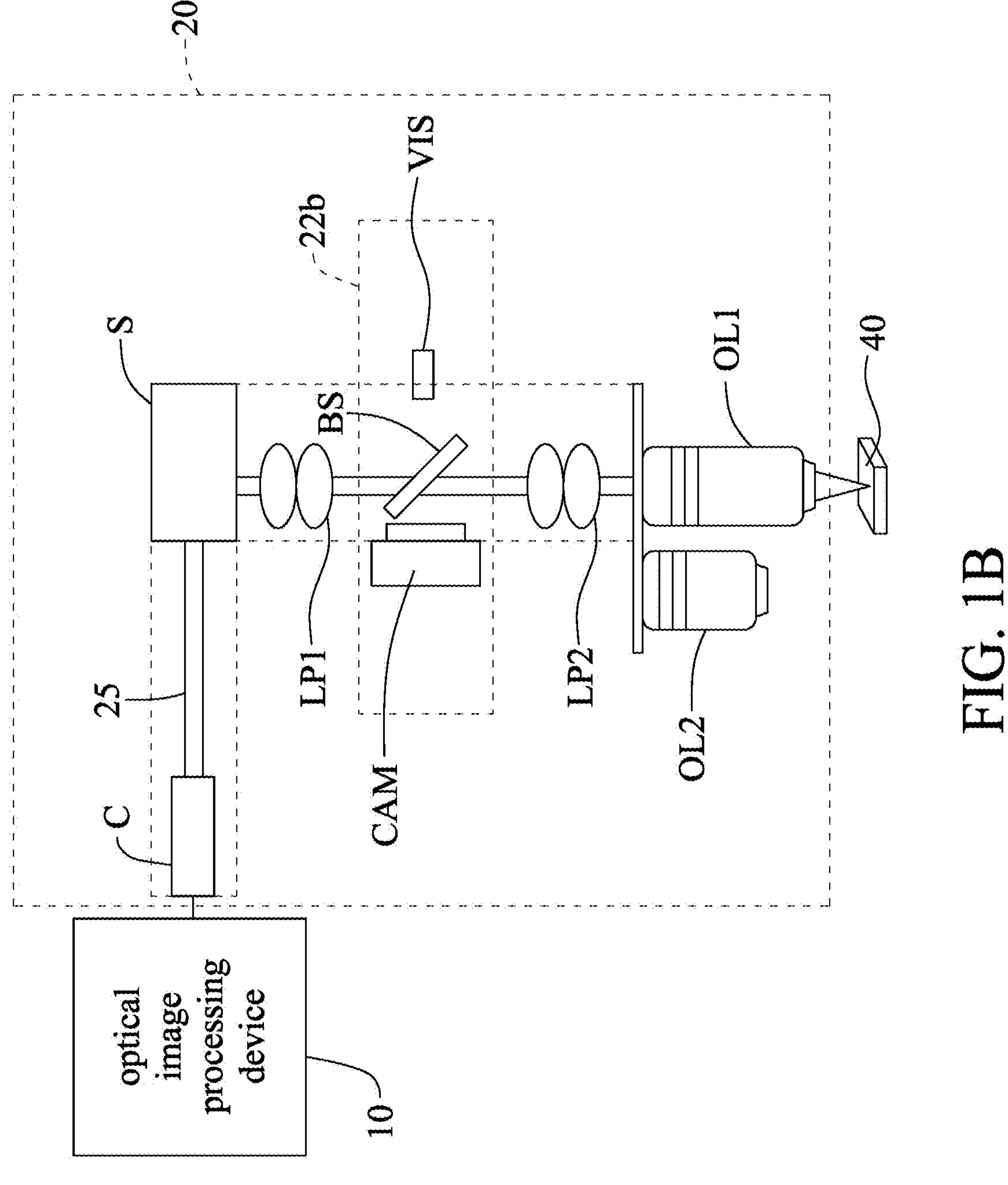
FIG. 1B is a schematic block diagram of an optical scanning system for non-destructively acquiring a three-dimensional structure of an object according to a second embodiment of the present disclosure.

Refer to FIG. 1B showing a schematic block diagram of an optical scanning system for non-destructively acquiring a three-dimensional structure of an object according to a second embodiment of the present disclosure. A difference of the embodiment in FIG. 1B from the embodiment in FIG. 1A is that, the camera CAM and the visible light source VIS in a visible light camera module 22*b* in the embodiment in FIG. 1B are disposed at positions different from those of the visible light camera module 22*a* in FIG. 1A, while the remaining components are the same as those of the embodiment in FIG. 1A and thus such repeated details are omitted herein.

The visible light camera module 22*b* can be composed of a camera CAM, a visible light source VIS and a beam splitter BS. The beam splitter BS can be disposed in the second optical axis direction 32, and the camera CAM and the visible light source VIS are disposed on two opposite sides of the beam splitter BS, respectively. More specifically, the camera CAM is disposed on the left of the second optical axis direction 32, and the visible light source VIS is disposed on the right of the second optical axis direction 32.

Figure 1C:
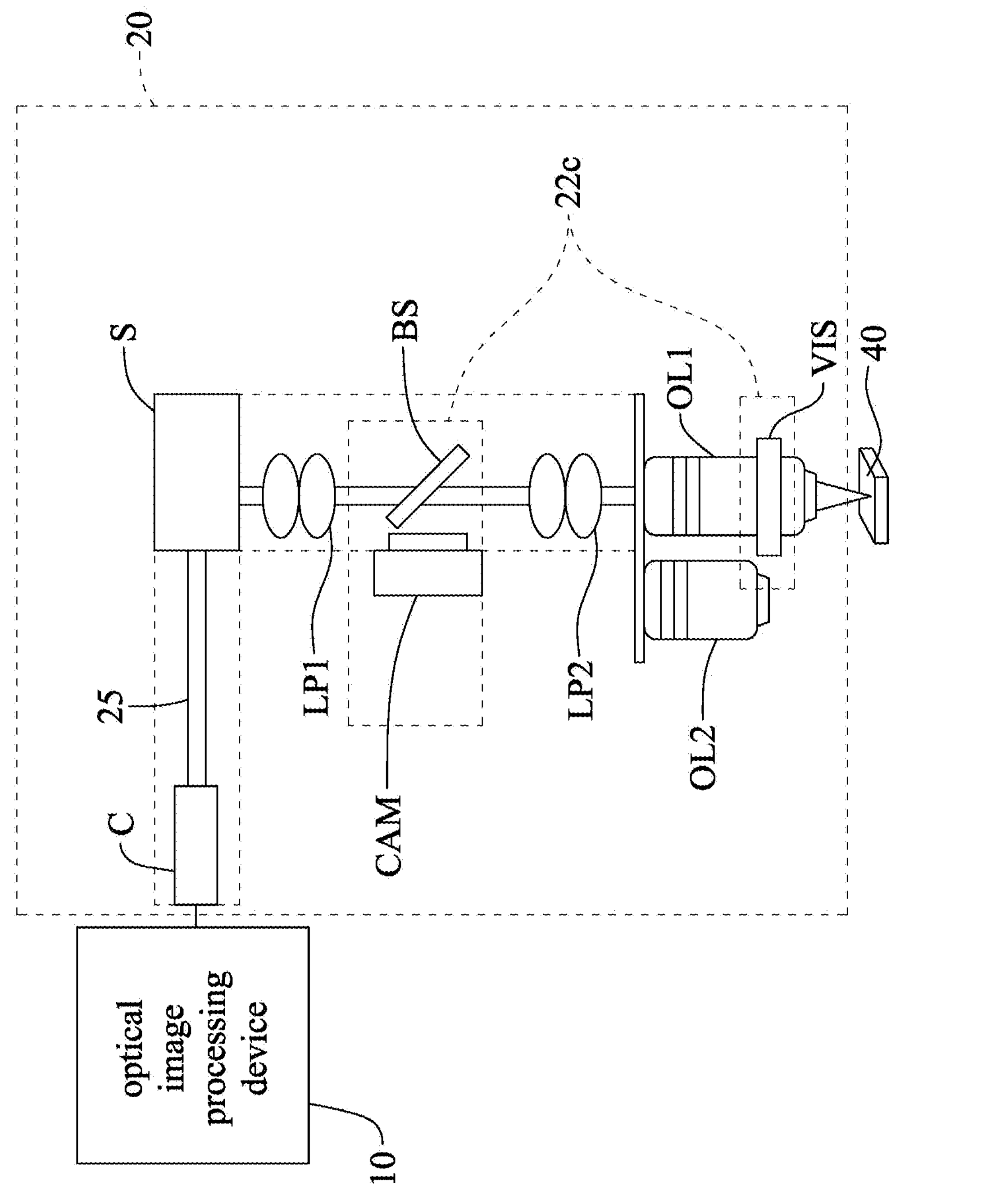
FIG. 1C is a schematic block diagram of an optical scanning system for non-destructively acquiring a three-dimensional structure of an object according to a third embodiment of the present disclosure.

Refer to FIG. 1C showing a schematic block diagram of an optical scanning system for non-destructively acquiring a three-dimensional structure of an object according to a third embodiment of the present disclosure. A difference of the embodiment in FIG. 1C from the embodiment in FIG. 1B is that, the camera CAM and the visible light source VIS in a visible light camera module 22*c* in the embodiment in FIG. 1C are disposed at positions different from those of the visible light camera module 22*b* in FIG. 1B, while the remaining components are the same as those of the embodiment in FIG. 1B and thus such repeated details are omitted herein.

The visible light camera module 22*c* can be composed of a camera CAM, a visible light source VIS and a beam splitter BS. The beam splitter BS can be disposed in the second optical axis direction 32, and the visible light source VIS is disposed closely next to the first object lens OL1. The visible light source VIS is operable to illuminate the object 40 to be inspected. More specifically, the camera CAM is disposed on the left of the second optical axis direction 32, and the visible light source VIS is disposed in the second optical axis direction 32 and disposed closely next to the first object lens OL1.

Figure 1D:
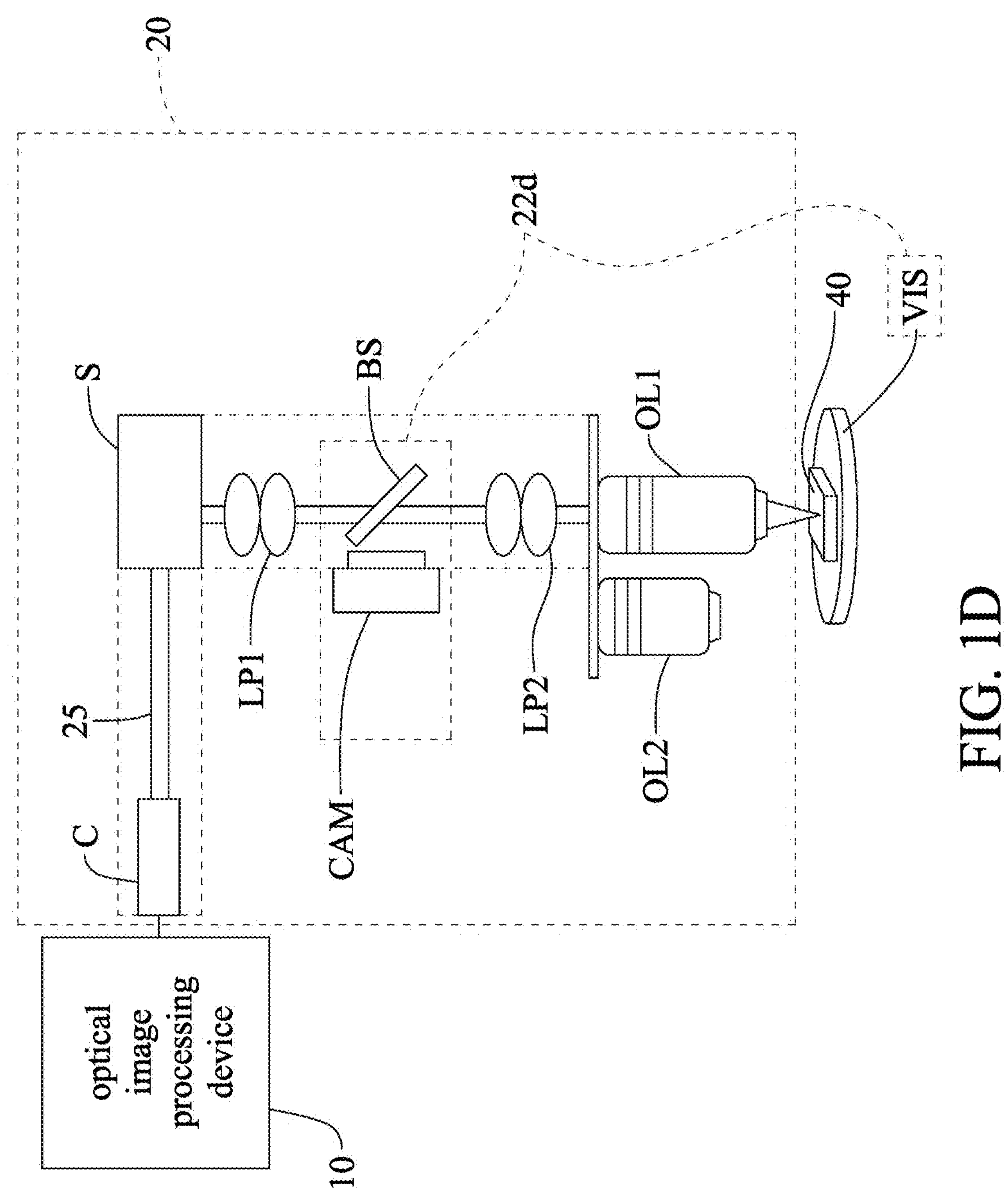
FIG. 1D is a schematic block diagram of an optical scanning system for non-destructively acquiring a three-dimensional structure of an object according to a fourth embodiment of the present disclosure.

Refer to FIG. 1D showing a schematic block diagram of an optical scanning system for non-destructively acquiring a three-dimensional structure of an object according to a fourth embodiment of the present disclosure. A difference of the embodiment in FIG. 1D from the embodiment in FIG. 1C is that, the camera CAM and the visible light source VIS in a visible light camera module 22*d* in the embodiment in FIG. 1D are disposed at positions different from those of the visible light camera module 22*c* in FIG. 1C, while the remaining components are the same as those of the embodiment in FIG. 1C and thus such repeated details are omitted herein.

The visible light camera module 22*d* can be composed of a camera CAM, a visible light source VIS and a beam splitter BS. The beam splitter BS can be disposed in the second optical axis direction 32, and the visible light source VIS is disposed closely on a bottom surface of the object 40 to be inspected. The visible light source VIS is operable to illuminate the object 40 to be inspected. The visible light source VIS is operable to illuminate the object 40 to be inspected. More specifically, the camera CAM is disposed on the left of the second optical axis direction 32, and the visible light source VIS is disposed in the second optical axis direction 32 and disposed closely on the bottom surface of the object 40 to be inspected.

For better illustration purposes, the structure of the first embodiment of the present disclosure is taken as an example in the description below. The same or similar effects can also be achieved if the structures of the second embodiment to the fourth embodiment of the present disclosure are adopted.

Figure 2:
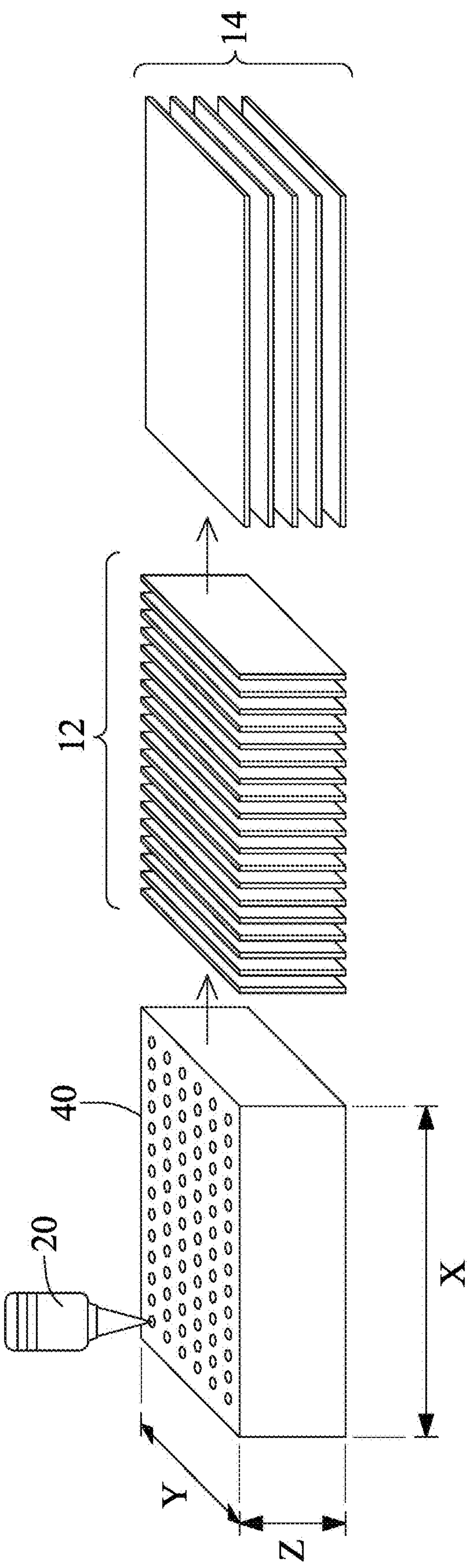
FIG. 2 is a schematic diagram of YZ cross section structural images and XY cross section structural images of an optical scanning system for non-destructively acquiring a three-dimensional structure of an object according to the first embodiment of the present disclosure.

Refer to FIG. 2 showing a schematic diagram of YZ cross section structural images and XZ cross section structural images according to the first embodiment of the present disclosure.

When the optical scanning device 20 scans the object 40 to be inspected along the Y-axis direction, corresponding optical signals can be acquired. The optical scanning device 20 can implement the scanning operation along the Y-axis direction by a driving device (not shown). The driving device can be, for example but not limited to, a linear motor. The optical signals can be transmitted by the optical scanning device 20 to the optical image processing device 10 for signal and image conversion processing, so as to acquire a YZ cross section structural image 12 corresponding to the object 40 to be inspected. Next, when the optical scanning device 20 scans the object 40 to be inspected along the X-axis direction, corresponding optical signals can be obtained. The optical signals can be transmitted by the optical scanning device 20 to the optical image processing device 10 for signal and image conversion processing, so as to acquire sequential YZ cross section structural images 12 corresponding to the object 40 to be inspected at different consecutive positions.

Similarly, when the optical scanning device 20 scans the object 40 to be inspected along the X-axis direction, corresponding optical signals can be acquired. The optical scanning device 20 can implement the scanning operation along the X-axis direction by a driving device. The optical signals can be transmitted by the optical scanning device 20 to the optical image processing device 10 for signal and image conversion processing, so as to acquire an XZ cross section structural image corresponding to the object 40 to be inspected (to simplify the contents presented by the drawings, the schematic diagram of the XZ cross section structural image is not depicted in FIG. 2). Next, when the optical scanning device 20 scans the object 40 to be inspected along the Y-axis direction, corresponding optical signals can be obtained. The optical signals can be transmitted by the optical scanning device 20 to the optical image processing device 10 for signal and image conversion processing, so as to acquire sequential XZ cross section structural images corresponding to the object 40 to be inspected at different consecutive positions.

The optical image processing device 10 can form XY cross section structural images 14 at different consecutive depths (the Z-axis direction) by combinations according to the sequential YZ cross section structural images at different consecutive positions or the sequential XZ cross section structural images at different consecutive positions. Thus, the optical image processing device 10 can reconstruct a three-dimensional structural image corresponding to the object 40 to be inspected. The three-dimensional structural image can include, for example but not limited to, the YZ cross section structural images at different consecutive positions, the XZ cross section structural images at different consecutive positions, and the XY cross section structural images 14 at different consecutive depths.

Moreover, when the optical scanning device 20 scans the object 40 to be inspected, optical signals in the Z-axis direction can be obtained. Thus, without particularly changing the position of the optical scanning device 20 in the Z-axis direction by a driving device, ease of inspection for the object 40 to be inspected can be enhanced, and the time for scanning the object 40 to be inspected can also be reduced.

Figure 3:
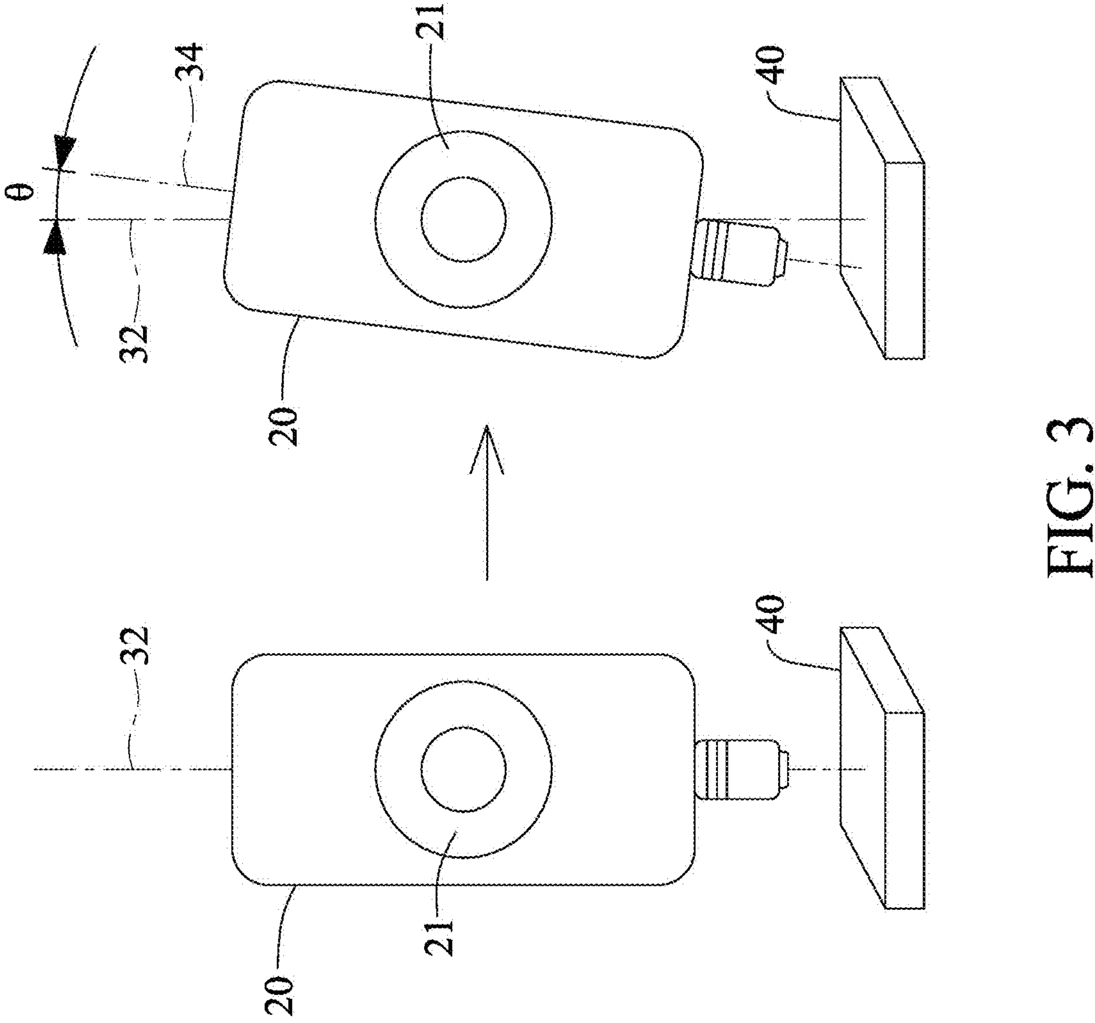
FIG. 3 is a schematic diagram of a deviated optical scanning device according to the first embodiment of the present disclosure.

Refer to FIG. 3 showing a schematic diagram of a deviated optical scanning device according to the first embodiment of the present disclosure.

To acquire a structural image (for example, a sidewall or a shape) of the object 40 to be inspected in a predetermined direction, the optical scanning device 20 can be deviated by a predetermined angle θ by a steering device 21. For example, the optical scanning device 20 scans the object 40 to be inspected along the second optical axis direction 32. When a structural image of the object 40 to be inspected in a predetermined direction is in need of inspection, the optical scanning device 20 can be deviated to a third optical axis direction 34 by the steering device 21, so as to form the predetermined angle θ between the second optical axis direction 32 and the third optical axis direction 34. The predetermined angle θ can be, for example, within the range between 20° and 70°, and is preferably 45°. Thus, measurement items of the optical scanning system 100 for non-destructively acquiring a three-dimensional structure of an object can be enhanced. In other embodiments, to acquire a structural image (for example, a sidewall or a shape) of the object 40 to be inspected in a predetermined direction, the optical scanning device 20 can be kept still, and the object 40 to be inspected can be deviated by the predetermined angle θ by another steering device (not shown).

Figure 4:
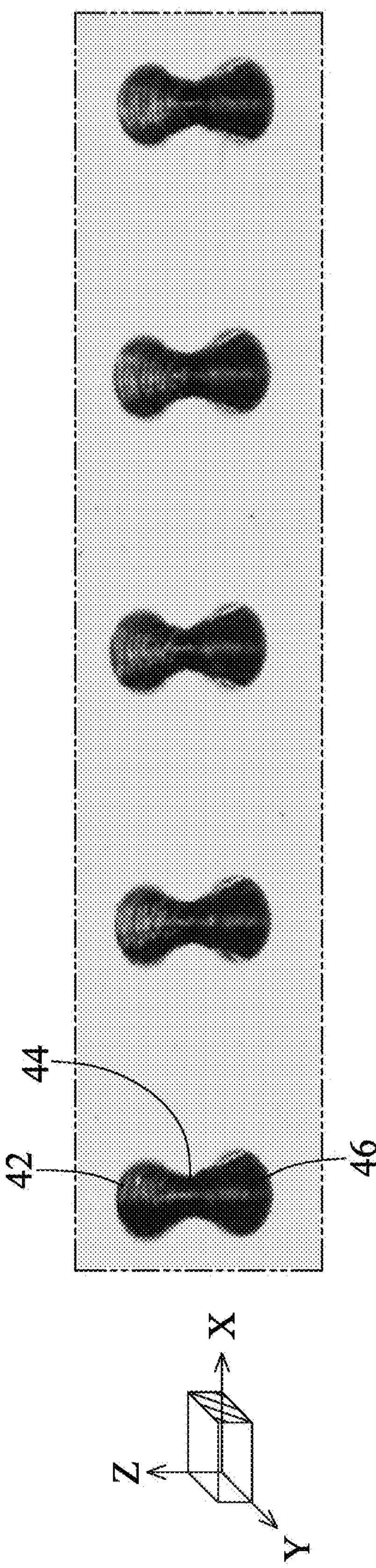
FIG. 4 is a diagram of an image after the optical scanning device in the embodiment in FIG. 3 is deviated by a predetermined angle and scans an object to be inspected.

Refer to FIG. 4 showing a diagram of an image after the optical scanning device in the embodiment in FIG. 3 is deviated by the predetermined angle θ and scans an object to be inspected.

In this embodiment, the object 40 to be inspected is a glass substrate, which has multiple through glass vias (TGVs). A three-dimensional structural image of each TGV along the X-axis direction can be observed from FIG. 4. It can be identified whether a TGV is defective by observing the three-dimensional structural image from a top 42, a waist 44 to a bottom 46 of each TGV, or information of each TGV such as the shape, waist depth, taper angle, position and size can be acquired by observing the three-dimensional structural image from the top 42, the waist 44 to the bottom 46 of each TGV. The information above can be further provided as references for adjusting or modifying manufacturing parameters of TGVs.

Figure 5:
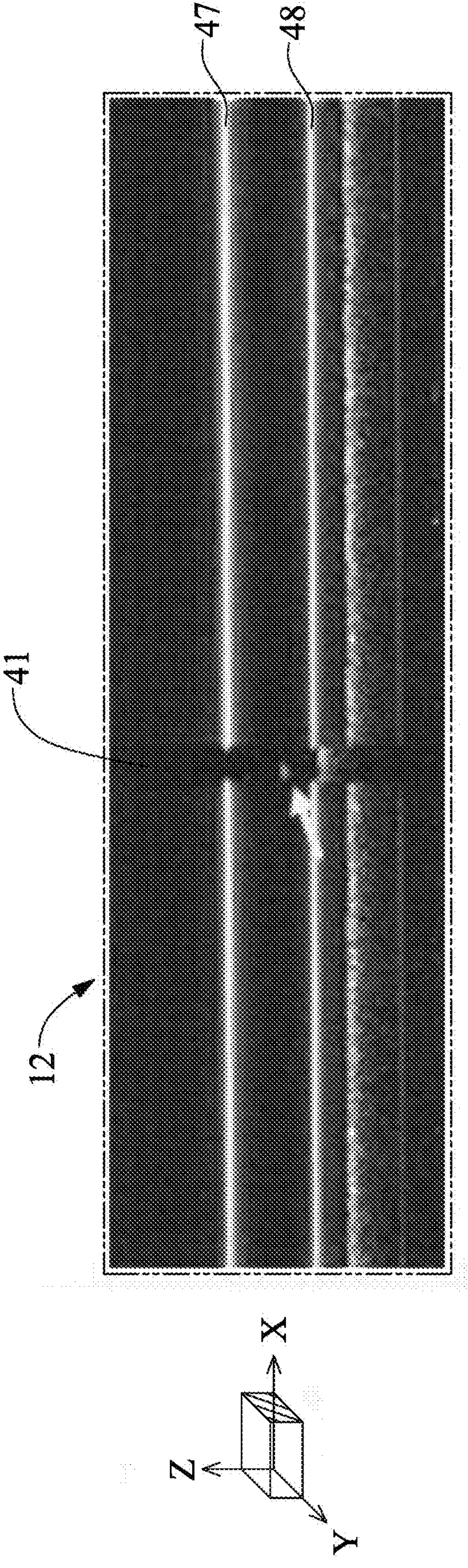
FIG. 5 is a diagram of a YZ cross section structural image according to the first embodiment of the present disclosure.

Refer to FIG. 5 showing a diagram of a YZ cross section structural image according to the first embodiment of the present disclosure.

In this embodiment, image features of a top surface 47 and image features of a bottom surface 48 can be identified from the YZ cross section structural image 12, a distance value (or referred to as an optical path difference) between the top surface 47 and the bottom surface 48 is calculated, and then the distance value is divided by an optical refractive index of the object 40 to be inspected to acquire a thickness value of the object 40 to be inspected. In other embodiments, image features of the top surface 47 and image features of the bottom surface 48 can be also identified from the XZ cross section structural image, the distance value (or referred to as an optical path difference) between the top surface 47 and the bottom surface 48 is calculated, and then the distance value is divided by the optical refractive index of the object 40 to be inspected to acquire the thickness value of the object 40 to be inspected.

In the YZ cross section structural image 12, it is clearly seen that a defect is present at a position 41 (as indicated by the arrow) of the TGV. Thus, the embodiments of the present disclosure are capable of easily and clearly observing the internal structure and defects of a TGV, and solving the issue of inability of observing the internal structure of a TGV in the prior art. Moreover, because the embodiments of the present disclosure are non-destructive inspection means, the issue of increased manufacturing costs of TGVs caused by a destructive inspection means of the prior art is eliminated.

Figure 6A:
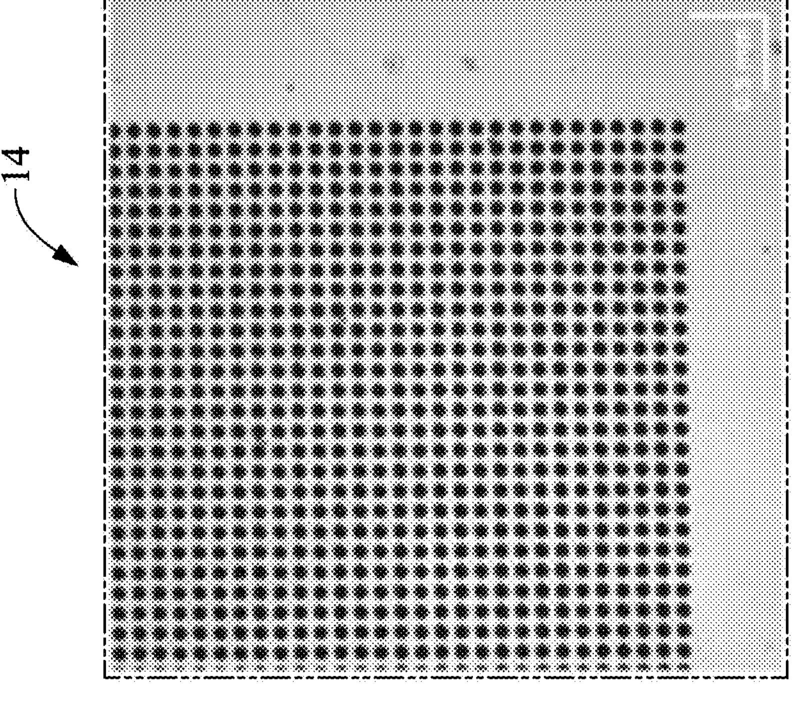
FIG. 6A is a diagram of an XY cross section structural image acquired on a top in the Z-axis direction according to the first embodiment of the present disclosure.
Figure 6A:
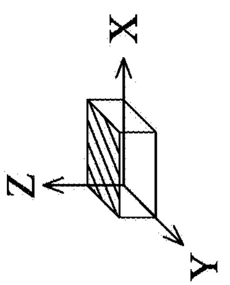

Refer to FIG. 6A to FIG. 6C showing diagrams of XY cross section structural images acquired at different consecutive positions in the Z-axis direction according to the first embodiment of the present disclosure.

In this embodiment, the object 40 to be inspected is a glass substrate, which has multiple through glass vias (TGVs). To determine the quality and the minimum aperture size of the TGV, an optical reflection device (not shown) is disposed below the object 40 to be inspected. The optical reflection device can be made of, for example, a material that easily causes optical reflection such as a reflecting mirror, an aluminum sheet or glass.

Once a scanning optical beam passes the TGV and reaches the optical reflection device below, the optical reflection device reflects the scanning optical beam back to the optical image processing device 10. The optical image processing device 10 can present the XY cross section structural images 14 at different consecutive positions in the Z-axis direction. As shown in FIG. 6A, the TGVs are presented as black dots in the XY cross section structural image on the top. As shown in FIG. 6B, the TGVs are presented as white dots in the XY cross section structural image at the waist. The white dots are due to the reflection, and the exhibition in white (or bright) means that the vias of the TGVs are through. As shown in FIG. 6C, the TGVs are presented as black dots in the XY cross section structural image on the bottom surface.

In case of congestion or other defects in the TGV, the shape of the white dot (for example, the white dot in the small square frame in FIG. 6B) is affected. Thus, it can be determined whether congestion or defects exist in the TGV by detecting the area and shape of bright white dot. Therefore, this embodiment is capable of determining, on the basis of the XY cross section structural images at different consecutive positions in the Z-axis, whether the TGV is congested.

Moreover, the area of the bright white dot after the scanning optical beam is incident on the TGV and is reflected back is determined by a narrowest range of the TGV, that is, the waist, and a reflected scanning optical beam greater than the range of the waist is blocked and cannot return to the optical image processing device 10 through the TGV. Thus, an area value of the reflected dot can be regarded as an area value of the aperture at the waist of the TGV. Therefore, this embodiment is capable of acquiring the area value of the waist of the TGV on the basis of the XY cross section structural images at different consecutive positions in the Z-axis, further enhancing measurement items for TGVs.

In other embodiments, the optical image processing device 10 can label an image with TGV defects in the XY cross section structural image, so as to more readily acquire information of the position and number of the TGV defects. The information above can be further provided as references for adjusting or modifying manufacturing parameters of TGVs.

In conclusion, the optical scanning system for non-destructively acquiring a three-dimensional structure of an object uses, by an optical scanning device, optical beams to scan an object to be inspected so as to acquire optical signals, and then converts the optical signals by an optical image processing device to present a three-dimensional structural image corresponding to the object to be inspected, thereby readily simultaneously observing external and internal structures of the object to be inspected. Thus, the issue that a conventional optical microscope is unable to observe an internal structure of a sample, although capable of scaling up and imaging a surface of a sample and analyzing conditions of the surface of the sample via an obtained image of the surface, can be solved. Since the structure of the optical scanning device is far simpler and cheaper than a scanning electronic microscope, the issue of costly inspection apparatuses in the prior art can also be solved, and inspection costs of an object to be inspected can also be reduced. Moreover, the optical scanning device can further be deviated by a predetermined angle to inspect a structural image of the object to be inspected in a predetermined direction, hence enhancing measurement items of the optical scanning system.

While the present invention has been described by means of specific embodiments, numerous modifications and variations could be made thereto by those skilled in the art without departing from the scope and spirit of the present invention set forth in the claims.

What is claimed is:

1. An optical scanning system for non-destructively acquiring a three-dimensional structure of an object, comprising:

an optical image processing device, configured to generate an optical beam along a first optical axis direction; and an optical scanning device, coupled to the optical image processing device, configured to convert the optical beam along the first optical axis direction into an optical beam along a second optical axis direction, and scan an object to be inspected by using the optical beam along the second optical axis direction, wherein the optical scanning device further comprises:

an optical collimator, configured to convert the optical beam along the first optical axis direction into a beam parallel to the first optical axis direction;

an optical beam scanner, disposed at an intersecting position of the first optical axis direction and the second optical axis direction, configured to convert the optical beam parallel to the first optical axis direction into an optical beam parallel to the second optical axis direction;

a first lens group, disposed in the second optical axis direction, configured to expand or reduce the optical beam parallel to the second optical axis direction;

a visible light camera module, disposed in the second optical axis direction, configured to capture a two-dimensional structural image corresponding to the object to be inspected;

a second lens group, disposed in the second optical axis direction, configured to expand or reduce the optical beam parallel to the second optical axis direction; and an object lens module, disposed in the second optical axis direction and located on one side of the second lens group, configured to focus and project the optical beam parallel to the second optical axis direction onto the object to be inspected;

wherein the optical image processing device scans the object to be inspected along a Y-axis direction by the optical scanning device to acquire a YZ cross section structural image corresponding to the object to be inspected, and then scans along an X-axis direction to acquire sequential YZ cross section structural images corresponding to the object to be inspected at different consecutive positions;

wherein the optical image processing device further scans the object to be inspected along the X-axis direction by the optical scanning device to acquire an XZ cross section structural image corresponding to the object to be inspected at different consecutive positions, and then scans along the Y-axis direction to acquire sequential XZ cross section structural images corresponding to the object to be inspected at different consecutive positions;

wherein the optical image processing device further reconstructs a three-dimensional structural image of the object to be inspected according to the YZ cross section structural images corresponding to the object to be inspected at different consecutive positions and the XZ cross section structural images corresponding to the object to be inspected at different consecutive positions;

wherein in response to the object to be inspected being a glass substrate having a plurality of through glass vias (TGVs), the optical image processing device is configured to control the optical scanning device to perform a sequential scanning operation along a Z-axis direction so as to acquire a plurality of XY cross-sectional structural images at different consecutive positions within the glass substrate, and is further configured to derive, from variations among the plurality of XY cross-sectional structural images, at least one of a shape, a waist depth, a taper angle, a position, and a size of each TGVs, thereby identifying congestion and/or defects of each TGVs.

2. The optical scanning system for non-destructively acquiring a three-dimensional structure of an object according to claim 1, wherein the visible light camera module is composed of a camera, a visible light source and a beam splitter, and the beam splitter is disposed in the second optical axis direction.

3. The optical scanning system for non-destructively acquiring a three-dimensional structure of an object according to claim 2, wherein the camera and the visible light source are disposed on two adjacent sides of the beam splitter, respectively.

4. The optical scanning system for non-destructively acquiring a three-dimensional structure of an object according to claim 2, wherein the visible light source is disposed closely next to the object lens module to illuminate the object to be inspected.

5. The optical scanning system for non-destructively acquiring a three-dimensional structure of an object according to claim 2, wherein the visible light source is disposed closely on a bottom surface of the object to be inspected to illuminate the object to be inspected.

6. The optical scanning system for non-destructively acquiring a three-dimensional structure of an object according to claim 1, wherein a focus magnification of the object lens module is adjustable/switchable.

7. The optical scanning system for non-destructively acquiring a three-dimensional structure of an object according to claim 1 further comprising:

a steering device, coupled to the optical scanning device, operable to turn the optical scanning device and render the optical scanning device to deviate from the second optical axis direction by a predetermined angle.

8. The optical scanning system for non-destructively acquiring a three-dimensional structure of an object according to claim 1, wherein the optical image processing device further calculates a thickness value of the object to be inspected according to the YZ cross section structural image or the XZ cross section structural image.

* * * * *